United States Patent

[11] 3,630,757

| [72] | Inventor | Charles E. Meid<br>Arlington Heights, Ill. |
|---|---|---|
| [21] | Appl. No. | 813,811 |
| [22] | Filed | Apr. 1, 1969 |
| [45] | Patented | Dec. 28, 1971 |
| [73] | Assignee | Kraftco Corporation<br>Continuation-in-part of application Ser. No. 732,516, May 28, 1968, now abandoned. This application Apr. 1, 1969, Ser. No. 813,811 |

[54] METHOD OF MAKING SIMULATED TOMATO PRODUCTS WITH MUSTARD SEED HULLS
3 Claims, No Drawings

| [52] | U.S. Cl. | 99/144 |
|---|---|---|
| [51] | Int. Cl. | A23l 1/22 |
| [50] | Field of Search | 99/144, 101 |

[56] References Cited

UNITED STATES PATENTS

| 1,883,367 | 10/1932 | Gray | 99/144 |
|---|---|---|---|
| 2,263,483 | 11/1941 | Baumann | 99/136 |
| 2,331,308 | 10/1943 | Cooper | 99/144 |

*Primary Examiner*—Raymond N. Jones
*Assistant Examiner*—J. M. Hunter
*Attorney*—Fitch, Even, Tabin & Luedeka

ABSTRACT: A composition is provided containing substantially no tomato solids which is similar to the body and consistency of products prepared from tomatoes. The composition comprises a bodying agent which is used for establishing body and consistency and may comprise a gum or starch material. The bodying agent is mustard seed hulls.

METHOD OF MAKING SIMULATED TOMATO PRODUCTS WITH MUSTARD SEED HULLS

This application is a continuation-in-part of application Ser. No. 732,516, filed May 28, 1968 and now abandoned.

The present invention relates generally to an edible composition having a body and texture substantially similar to that of concentrated dispersions of tomato solids, and to a method for producing such edible composition. More particularly, the present invention is related to an edible composition provided substantially from nontomato components wherein such composition has the taste and body characteristics of tomato product prepared from concentrated dispersions of tomatoes.

It is well known that consistency or body is one of the most important factors determining the organoleptic qualities of certain food products, such as food products prepared from tomatoes, i.e., tomato paste, tomato puree, ketchup and tomato juice. In order to obtain a product of good consistency from tomatoes, it is essential to preserve during the manufacturing process the pectin naturally occurring in the tomatoes. It is known that tomatoes contain a very active pectin-methoxylase enzyme (pectase). When in the course of preparation of a tomato product the cell structure of the tomatoes is destroyed, this enzyme gains access to the pectin and by splitting off methyl alcohol transforms the pectin into pectic acid. Pectic acid does not possess the important colloidal properties of pectin, and a decline or degradation in the consistency or body of tomato products occurs. Tomato products prepared by concentrating dispersions of tomato solids that contain high levels of pectin have unique body and consistency properties that have been heretofore difficult or impossible to duplicate.

It is also known that body and consistency similar to that provided by concentrated dispersions of tomato solids cannot be provided in compositions containing substantially no tomato solids by merely adding pectin thereto.

It has also long been a goal in the industry to provide a composition which duplicates the consistency or body of tomato dispersions from nontomato components. However, as indicated above, the organoleptic qualities of tomato products are uniquely determined by the level of pectin in the tomato product, and it has not been heretofore thought possible to provide a nonpectin containing composition which would duplicate the organoleptic qualities of tomato products. In this connection, numerous gums and colloids, including pectin, have been investigated for their ability to act as a bodying agent to provide a composition duplicating the organoleptic qualities of tomato products. Heretofore, none of these materials have been found to be satisfactory.

Accordingly, it is an object of the invention to provide an edible composition from substantially nontomato components having a body similar to that associated with tomato products. It is another object of the invention to provide a method for preparing an edible composition having a body substantially similar to products prepared from concentrated dispersions of tomato solids. It is a further object of the invention to provide a bodying agent suitable for establishing body and consistency in edible compositions which is substantially similar to that provided by concentrated tomato dispersion. It is a still further object of the invention to provide edible compositions from substantially nontomato components having a taste and body substantially similar to products prepared from dispersions of tomato solids.

These and other objects of the invention will become more apparent from the following detailed disclosure of the invention.

Generally, in accordance with various of the features of the invention, a bodying agent is provided which may be used for establishing body and consistency in edible compositions containing substantially no tomato solids which is similar to the body and consistency of products prepared from tomatoes.

The bodying agent is selected from the seed coating or "hulls" of various cereal and spice grains. Such seed coatings are generally referred to as "bran." Hereinafter in the present invention the term "bran" will sometimes be used to refer to the seed coatings which are used in the invention. Preferred brans for use in the invention are those obtained from the seed hulls of mustard, foenugreek flax, rape seed and psyllium. A particularly preferred bran is that obtained from the seed hulls of mustard.

It is generally desirable to provide the bran in a comminuted state. In this connection, in a preferred embodiment of the invention, the bran is comminuted to a particle size of less than about 350 microns. However, in the compositions of the present invention other solids are present at particle sizes above about 350 microns and the bran may be provided at a particle size at least as large as the largest particle size of the other components of the composition. In general, the bran may be provided at particle sizes of up to about 500 microns without substantially influencing the mouth feel of the edible compositions of the invention.

The bran may be ground or comminuted prior to addition of the bran to other components of the invention. In this connection the bran may be ground by any suitable method, such as with a low-speed stone mill or high-speed colloid mill or high shear impact mill. It is, however, preferred to grind the bran by means which develop a macerating or smearing effect, such as a stone mill or colloid mill. Maceration or smearing of the bran during grinding appears to release more of the active components of the cells of the bran than do grinding means which reduce particle size by impact or shear alone.

In a preferred embodiment of the invention the bran is added to some or all of the other components of the composition and the mixture is then comminuted by suitable equipment, such as a colloid mill. By combining the bran with other ingredients and then effecting grinding a better mixture of ingredients is obtained.

In accordance with the invention, a base composition can be provided from nontomato components which is suitable for further processing into products similar to various known tomato-type products. A base composition for providing various tomato flavored products may be prepared which comprises the bodying agent of the invention, acids, spices and flavoring materials, salts, water and suitable coloring materials. The base composition may be provided with a body and viscosity substantially heavier than that desired in the finished product, and may thereafter be modified to provide various flavored products resembling products such as tomato sauce, barbecue sauce, ketchup and other tomato-type products.

In providing compositions of the invention wherein substantially no tomato solids are present, it is generally desirable to provide the bran at a level of at least about 2.0 percent by weight of the finished composition. It is preferred that the bran be present at a level of about 3 percent by weight of the finished composition. When mustard bran is used as the bodying agent, the bran may be used at levels of up to about 5.0 percent by weight of the composition before a typical mustard "bite" is obtained. In this connection, it is known to inactivate the "bite" producing compounds of whole mustard seed by heat and provide a whole seed containing both the hull and the inner seed that is bland. Such bland whole seed after comminution may be used to provide bran in accordance with the invention at levels above about 5 percent, although no particular advantage accrues to the use of such higher levels.

The bran is preferably provided from seed hulls without the accompanying seed material. It is also possible to provide the bran by adding whole seeds to the composition and thereafter comminuting the seeds. This is not generally as desirable as providing the bran separate from the inner seed, since the inner seed contributes flavor which may not be desirable in the finished composition.

In a preferred embodiment of the invention, the bran is obtained from mustard seed hulls. In this connection, a preferred mustard seed bran is that obtained from the seeds of the Brassica alba mustard family.

The bodying agent of the invention may be used in combination with a suitable gum to provide particular properties.

Suitable gums include carob bean gum, guar gum, gum tragacanth, gum arabic, alginates, carrageenans, carboxymethylcellulose and pregelatinized starch. When used in combination with a gum, the bodying agent may be used at levels of as low as about 1.0 percent by weight of the edible composition. Gum, when used, is preferably used at levels of from about 0.01 percent to about 1.0 percent by weight of the dry ingredients of the composition. In a preferred embodiment of the present invention, mustard bran is used at a level of from about 1.0 percent in combination with carob bean gum at a level of from about 0.01 percent to about 0.10 percent to provide a more pronounced pulpy appearance.

Starch materials may also be used in the edible compositions of the invention. Starch materials, when used, provide edible compositions with more desirable texture and body for certain specific tomato-type products. Preferred starch materials are cornstarch and potato granules. Potato granules are generally prepared by steaming peeled potato slices until the starch is gelatinized, after which the potato slices are mashed, dried and sifted. The resultant potato granules have a particle size of less than about 50 mesh. The starch of the potato granules is still primarily contained within the cell wall of the potato granules and the potato granules when hydrated have a mashed potato appearance.

Starch materials are used at a level of from about 0.5 percent to about 5.0 percent by weight of the edible composition. As the level of starch materials is increased in the edible composition the level of bodying agent may be reduced. However, the bodying agent must be used at levels of at least about 1.0 percent by weight of the edible composition.

The following examples further illustrate various of the features of the invention, but are intended to in no way limit the scope of the invention, which is defined in the appended claims.

EXAMPLE I

An edible composition is prepared from substantially nontomato ingredients, which resemble a tomato ketchup product. Two hundred pounds of the composition are prepared containing the following ingredients at the indicated levels:

| Ingredients | Weight Percent |
| --- | --- |
| Sucrose | 18.56 |
| Vinegar (100 grain) | 12.16 |
| Mustard bran (from Brassica alba type mustard) | 3.10 |
| Sodium chloride | 2.15 |
| Spices, flavoring and coloring materials | 1.52 |
| Spray dried tomato powder | 1.00 |
| Cornstarch | 0.96 |
| Vegetable Protein Hydrolysate | 0.58 |
| Citric acid | 0.34 |
| Adipic acid | 0.19 |
| Sodium benzoate (preserved) | 0.10 |
| Water | 59.34 |

The ketchup composition is prepared in the following manner: The vinegar is weighed into a holding tank equipped with an agitator. The water is metered into the tank and agitation is started so as to keep dry materials suspended as they are added. The mustard bran, preservative and spices are weighed and added to the holding tank. Agitation is continued for 15 minutes so as to thoroughly suspend the dry ingredients in the mixture. The mixture is then pumped to a colloid mill equipped with carborundum stones having a medium grit size. The setting of the mill is adjusted so that a 10°–15° F. temperature rise is observed as the mixture is pumped through the mill. After passing through the mill, the mixture is collected in a second holding tank and is agitated slowly. After all of the product is collected in the second holding tank the mixture is again passed through the colloid mill. The mill setting is again adjusted so that the once milled mixture again attains a 10°–15° temperature rise.

After having been passed through the colloid mill for the second time, the degree of comminution of the mixture is determined by placing a small sample of the mixture under a microscope. The particle size in microns is observed and the results are averaged over three to four readings. The results of the milling step are considered satisfactory if the largest size particles fall in the range of from about 250 to 500 microns.

The milled mixture is then pumped to a jacketed kettle equipped with a suitable mixer. The milled mixture is slowly agitated as a mixture of sucrose and cornstarch are added. The sodium chloride, ketchup spice oil, acids and vegetable protein hydrolysate are weighed and are slowly added to the kettle as agitation is continued. The mixture is then heated to a temperature of 195° F. while being agitated. The pH is then adjusted to read between 3.0 and 3.5 at a temperature of 20° C. This represents an acidity as percent acetic acid of from 1.8 to 2.0. The mixture is then cooled to a temperature of 180° F. and is packaged. Deaeration of the product prior to packaging is not usually required, but deaeration equipment can be placed in the line between the cooking kettle and the packaging equipment if it should be considered desirable.

Each of the packaged products has a texture, body and appearance substantially similar to that of tomato ketchup prepared from fresh whole tomatoes. The product prepared from the composition of the invention has an exceptionally stable and lengthy shelf life. There is no more indication of serum separation than is sometimes observed with ketchup products prepared from tomatoes.

EXAMPLE II

An edible composition is prepared in accordance with the method of example I having the following ingredients at the indicated levels:

| Ingredients | Weight Percent |
| --- | --- |
| Sucrose | 18.75 |
| Vinegar (100 grain) | 9.06 |
| Tomato Paste (32% solids) | 3.00 |
| Mustard Bran (from Brassica alba type mustard) | 2.00 |
| Spices, flavoring and coloring materials | 5.10 |
| Cornstarch | 1.75 |
| Potato granules | 1.75 |
| Malic acid | 0.40 |
| sodium benzoate (preservative) | 0.10 |
| Water | 58.19 |

The packaged edible composition has a texture, body and appearance substantially similar to that of tomato ketchup prepared from fresh whole tomatoes. In a direct comparison the edible composition of example II is preferred to the edible composition of example I. However, both are considered acceptable substitutes for tomato ketchup prepared from fresh whole tomatoes.

Food products prepared from concentrated dispersions of tomato solids, such as tomato sauce or ketchup, are subject to variations in consistency due to methods of processing, or tomato crop variations or the like. The bodying agent of the invention may also be used to provide consistent body and texture to such products prepared from tomato solids.

Various of the features of the invention are defined in the appended claims.

I claim:

1. A method for making an edible food composition having body, taste and mouth feel substantially similar to food products prepared from concentrated dispersions of tomato solids comprising providing a fluid dispersion of mustard seed hulls, comminuting said fluid mustard seed hull dispersion to provide comminuted mustard seed hulls having a particle size of less than about 500 microns, and mixing said comminuted mustard seed hull dispersion with condiments and a gum so as to provide the edible food composition with body and mouth feel substantially similar to food products prepared from concentrated dispersions of tomato solids, said comminuted mustard seed hulls being present at a level of at least 1.0 percent by weight of said edible composition.

2. A method for making an edible food composition having body, taste and mouth feel substantially similar to food products prepared from concentrated dispersions of tomato solids comprising providing a fluid dispersion of mustard seed hulls, comminuting said fluid mustard seed hull dispersion to provide comminuted mustard seed hulls having a particle size of less than about 500 microns, and mixing said comminuted mustard seed hull dispersion with condiments and a starch material so as to provide an edible composition having body, taste and mouth feel substantially similar to food products prepared from concentrated dispersions of tomato solids, said starch material being present at a level of from about 0.5 to about 5.0 percent by weight of the fluid dispersion, said comminuted mustard seed hulls being present at a level of at least about 1.0 percent by weight of said edible composition so as to provide the edible food composition with body and mouth feel substantially similar to food products prepared from concentrated dispersions of tomato solids.

3. A method in accordance with claim 2 in which said starch materials are selected from corn starch and potato granules.

* * * * *